US010560864B2

(12) United States Patent
Shaw et al.

(10) Patent No.: US 10,560,864 B2
(45) Date of Patent: *Feb. 11, 2020

(54) EVENT-DRIVEN NETWORK DEMAND FINDER OF A RADIO ACCESS NETWORK

(71) Applicant: AT&T Intellectual Property I, L.P., Atlanta, GA (US)

(72) Inventors: Venson Shaw, Kirkland, WA (US); Jin He, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/530,522

(22) Filed: Oct. 31, 2014

(65) Prior Publication Data

US 2016/0127943 A1 May 5, 2016

(51) Int. Cl.
*H04W 28/02* (2009.01)
(52) U.S. Cl.
CPC .............................. *H04W 28/0231* (2013.01)
(58) Field of Classification Search
CPC .................................................. H04W 28/0231
See application file for complete search history.

(56) References Cited

U.S. PATENT DOCUMENTS

| | | |
|---|---|---|
| 6,477,367 B1 | 11/2002 | Kim |
| 6,594,496 B2 | 7/2003 | Schwartz |
| 6,950,678 B1 | 9/2005 | Mujtaba et al. |
| 7,903,625 B1 | 3/2011 | Srinivas et al. |
| 7,929,970 B1 | 4/2011 | Gunasekara et al. |
| 7,986,973 B2 | 7/2011 | Rhodes et al. |
| 8,412,221 B2 | 4/2013 | Fan et al. |
| 8,498,207 B2 | 7/2013 | Trigui et al. |
| 8,509,166 B2 | 8/2013 | Kerpez et al. |
| 8,538,435 B2 | 9/2013 | Immendorf et al. |
| 8,543,112 B2 | 9/2013 | Fox et al. |
| 8,588,698 B2 | 11/2013 | Brisebois et al. |
| 8,589,541 B2 | 11/2013 | Raleigh et al. |
| 8,724,467 B2 | 5/2014 | Le Faucheur et al. |

(Continued)

OTHER PUBLICATIONS

Notice of Allowance dated Dec. 17, 2015 for U.S. Appl. No. 14/264,749, 15 pages.

(Continued)

*Primary Examiner* — Yemane Mesfin
*Assistant Examiner* — Henry Baron
(74) *Attorney, Agent, or Firm* — Amin, Turocy & Watson, LLP

(57) ABSTRACT

Network demand data can be determined by employing low cost sensing devices. In one aspect, the sensing devices can monitor user equipment activity and/or environmental conditions associated with a specific area. Sudden changes in the network demand at the area, for example, due to a planned or unplanned event, can be detected based on an analysis of the monitored information. Based on the changes, configuration parameters associated with antennas of one or more access points can be updated to improve network coverage and/or capacity at the area. In one example, a transmission power of an access point can be adjusted to increase network capacity. In another example, an antenna beam of the access point can be focused and/or steered towards the area to improve network coverage.

20 Claims, 14 Drawing Sheets

(56) References Cited

U.S. PATENT DOCUMENTS

| | | | |
|---|---|---|---|
| 8,725,158 B2* | 5/2014 | Campos | H04W 28/0289 455/445 |
| 8,743,776 B2 | 6/2014 | Gurajala | |
| 8,750,896 B2 | 6/2014 | Brisebois et al. | |
| 8,831,679 B2 | 9/2014 | Bajj et al. | |
| 9,166,732 B2 | 10/2015 | Causey et al. | |
| 9,693,326 B2 | 6/2017 | Lorca Hernando | |
| 9,980,285 B2 | 5/2018 | Brisebois et al. | |
| 10,057,785 B2 | 8/2018 | Kwak et al. | |
| 2009/0023477 A1 | 1/2009 | Staudte | |
| 2009/0296635 A1 | 12/2009 | Hui et al. | |
| 2010/0136996 A1 | 6/2010 | Han et al. | |
| 2010/0210290 A1 | 8/2010 | Riley et al. | |
| 2011/0287775 A1 | 11/2011 | Fan et al. | |
| 2013/0028107 A1 | 1/2013 | Ho et al. | |
| 2013/0114434 A1 | 5/2013 | Muruganathan et al. | |
| 2013/0272132 A1 | 10/2013 | Heo et al. | |
| 2013/0303218 A1* | 11/2013 | Teller | H04L 47/829 455/507 |
| 2014/0036656 A1 | 2/2014 | Chou et al. | |
| 2014/0146681 A1 | 5/2014 | Gusavec et al. | |
| 2014/0147125 A1 | 5/2014 | Chow | |
| 2016/0050265 A1* | 2/2016 | Botticelli | H04L 67/10 709/219 |

OTHER PUBLICATIONS

Notice of Allowance dated Jan. 6, 2016 for U.S. Appl. No. 14/329,732, 33 pages.
Office Action dated Aug. 25, 2015 for U.S. Appl. No. 14/264,749, 22 pages.
Iskander, et al., "Antenna Array Designs with Advanced Beam Steering Capabilities". http://www.ursi.org/proceedings/procGA08/papers/B04p1.pdf. URSI General Assembly held Aug. 7-16, 2008 in Chicago. Last accessed Feb. 14, 2014. 4 pages.
"Mentum Cell Planner". http://www.mentum.com/index.php?page=cellplanner&hl=en_US. Last accessed Dec. 30, 2011. 1 page.
"What is Mentum Planet?" published online at [http://www.mentum.com/index.php?page=mentum-planet&hl=en_US] archived version dated Nov. 19, 2011, retrieved from Wayback Machine on Feb. 11, 2015, 3 pages.
"CelPlanner", http://www.celplan.com/Products/CP.asp?Plan=true. Last accessed Dec. 30, 2011, 1 page.
Equilateral Technologies, "Wireless Network Planning and Optimization—RF Propagation Prediction", http://www.equilateral.com/broadband.html#optimization, last accessed Mar. 21, 2012.
Office Action dated Jul. 12, 2012 for U.S. Appl. No. 13/312,858, 29 pages.
Office Action dated Mar. 18, 2013 for U.S. Appl. No. 13/312,858, 22 pages.
Chiao et al., MEMS Reconfigurable Vee Antenna, 1999 IEEE MTT-S Digest, retrieved Oct. 23, 2013, pp. 1515-1517-1.
Office Action dated Oct. 23, 2013 for U.S. Appl. No. 13/272,273, 38 pages.
Office Action dated Aug. 1, 2013 for U.S. Appl. No. 13/312,858, 25 pages.
Office Action dated Dec. 30, 2013 for U.S. Appl. No. 13/222,555, 25 pages.
Office Action dated Dec. 19, 2013 for U.S. Appl. No. 13/312,858, 25 pages.
Equilateral Technologies "Broadband-eQ Network Planning Software". http://www.equilateral.com/broadband.html#optimization. Last accessed Dec. 30, 2011, 2 pages.
Notice of Allowance dated Jan. 30, 2014 for U.S. Appl. No. 13/272,273, 29 pages.
Li, et al., "Real Time Radio Coverage Monitoring in Selforganizing Networks with User Feedback". 2012 IEEE Fifth International Workshop on Selected Topics in Mobile and Wireless Computing. Oct. 2012, 8 pages.
Akyildiz, et al., "Next generation/dynamic spectrum access/cognitive radio wireless networks: A survey". Computer Networks 50 (2006) 2127-2159. www.elsevier.com/locate/comnet. Retrieved on Sep. 16, 2014, 33 pages.
Notice of Allowance dated Nov. 2, 2016 for U.S. Appl. No. 15/130,898. 26 pages.
Office Action dated Nov. 7, 2016 for U.S. Appl. No. 15/136,861. 38 pages.
Final Office Action dated Aug. 23, 2017 for U.S. Appl. No. 15/136,861, 26 pages.
Notice of Allowance dated Jan. 19, 2018 for U.S. Appl. No. 15/453,841, 46 pages.
Notice of Allowance received for U.S. Appl. No. 15/984,300 dated May 15, 2019, 32 pages.

* cited by examiner

EVENT-DRIVEN NETWORK DEMAND FINDER OF A RADIO ACCESS NETWORK

TECHNICAL FIELD

The subject disclosure relates to wireless communications, e.g., to an event-driven network demand finder of a radio access network.

BACKGROUND

Wireless service providers are observing an exponential growth in mobile communications due to both an increase in consumer demand and commercial requirements. Moreover, to ensure customer satisfaction, wireless service providers aim to deliver a high quality service to facilitate reliable and efficient mobile communications at all locations. However, wireless data usage has become difficult to predict and localize, and it is often difficult to tune the wireless network to suit this usage. Oftentimes, traffic demand at a specific location can change over time; for example, demand within a rural area, without network coverage, can suddenly increase due to a natural disaster or network capacity within a densely populated urban area can suddenly become inefficient due to a large event.

Conventional systems utilize received signal strength indicator (RSSI) and/or angle of arrival (AoA) measurement data received from user equipments (UEs), to determine whether radio access network (RAN) capacity is sufficient. However, this approach is expensive, time consuming and negatively affects battery lives of the UEs. In addition, this approach provides static provisioning based on UE measurement data and network devices cannot adapt to sudden changes in traffic demand, for example, due to an emergency event, special event, and/or external event.

DETAILED DESCRIPTION

Figure 1:
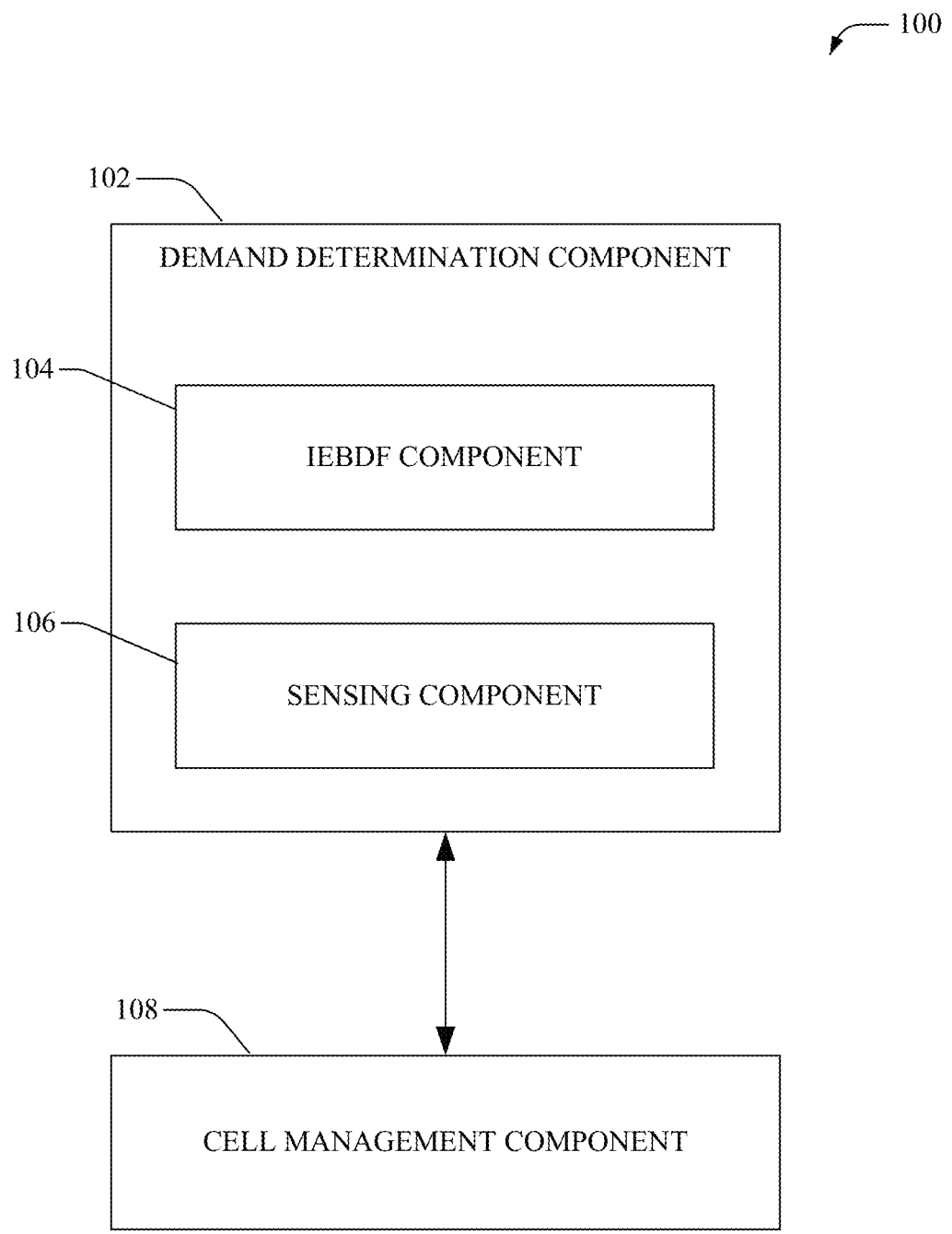
FIG. 1 illustrates an example system that can modify network coverage and/or capacity for areas with a surge in network demand.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile device," "mobile," "subscriber station," "mobile station," "communication device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "site," "eNodeB," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The systems and methods disclosed herein provide a means to improve network coverage, by dynamic beam steering/tuning to serve areas of high user density and/or network demand better. In contrast to conventional systems, the systems and methods disclosed herein can receive and analyze network demand data collected via network devices to detect locations of high network demand and dynamically provide additional network coverage and/or capacity to these locations.

Aspects or features of the subject specification can be exploited in substantially any wireless communication technology; e.g., Wi-Fi, Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee or another IEEE 802.XX technology. Additionally, substantially all aspects of the subject specification can be exploited in legacy telecommunication technologies and/or future communication technologies (e.g., 5G, whitespace, etc.).

Referring initially to FIG. 1, there illustrated is an example system 100 that can modify network coverage and/or capacity for areas with a high network demand, according to an aspect of the subject specification. The system 100 comprises a demand determination component 102 that identifies network demand at one or more locations based on measurement(s) determined by one or more network devices. Typically, network demand can fluctuate over time and can suddenly increase during events, for example, scheduled events, such as, but not limited to, social gathering(s), meeting(s), convention(s), concert(s), flash mob(s), political rally(ies), demonstration(s) or protest (s), parade(s), carnival(s) or fair(s), farmers market(s), marathon(s), or similar charity event(s), and/or unplanned events, such as, but not limited to evacuations, natural disasters, weather conditions, or criminal activities (e.g., terror attacks). In addition, network demand at a given location can increase in response to a trigger, such as, but not limited to, a promotion or sale at a store (e.g., thanksgiving sale), a delay in traffic (e.g., due to an accident), release of a new item/product in a store or a new movie/play in a theatre, etc.

In one aspect, the demand determination component 102 can comprise an intelligent event based demand finder (IEBDF) component 104 that can detect changes in network demand based on user equipment (UE) activity/density within a specific area (e.g., a dead zone and/or coverage hole). In another aspect, the demand determination component 102 can comprise a sensing component 106 that can detect changes in based on sensing weather conditions (e.g., temperature, wind, rain, etc.) and/or other environmental factors (e.g., seismic data) within the specific area. As an example, the sensing component 106 can include one or more sensors, such as, but not limited to, cluster sensors. The detected network demand data can be provided to a cell management component 108 that adjusts network coverage and/or capacity in a manner such that the network demand can be satisfied (e.g., at least partially).

According to an aspect, the cell management component 108 can reside within (e.g., completely or partially) and/or be coupled to one or more access points (e.g., macro access point, femto access point, pico station, Node B, eNodeB, homeNodeB (HNB), etc.). As an example, an access point can be most any cell site, for example, locations at which antennas (e.g., transmitter/receivers, transceivers) and/or electronic communications equipment are placed. As an example, a cell site can typically include communications equipment to create a cell in a cellular network. Moreover, on receiving network demand data from the demand determination component 102, the cell management component 108 can instruct the access point to re-direct or steer one or more antennas beams towards (or away from) the specific locations. As an example, beam steering can include switching one or more antenna elements or changing the relative phases of the radio frequency (RF) signals driving the one or more elements. In addition, other configuration parameters, such as, but not limited to, the transmission power of the one or more antennas of access point can be modified to optimize network capacity at the specific locations.

Figure 2A:
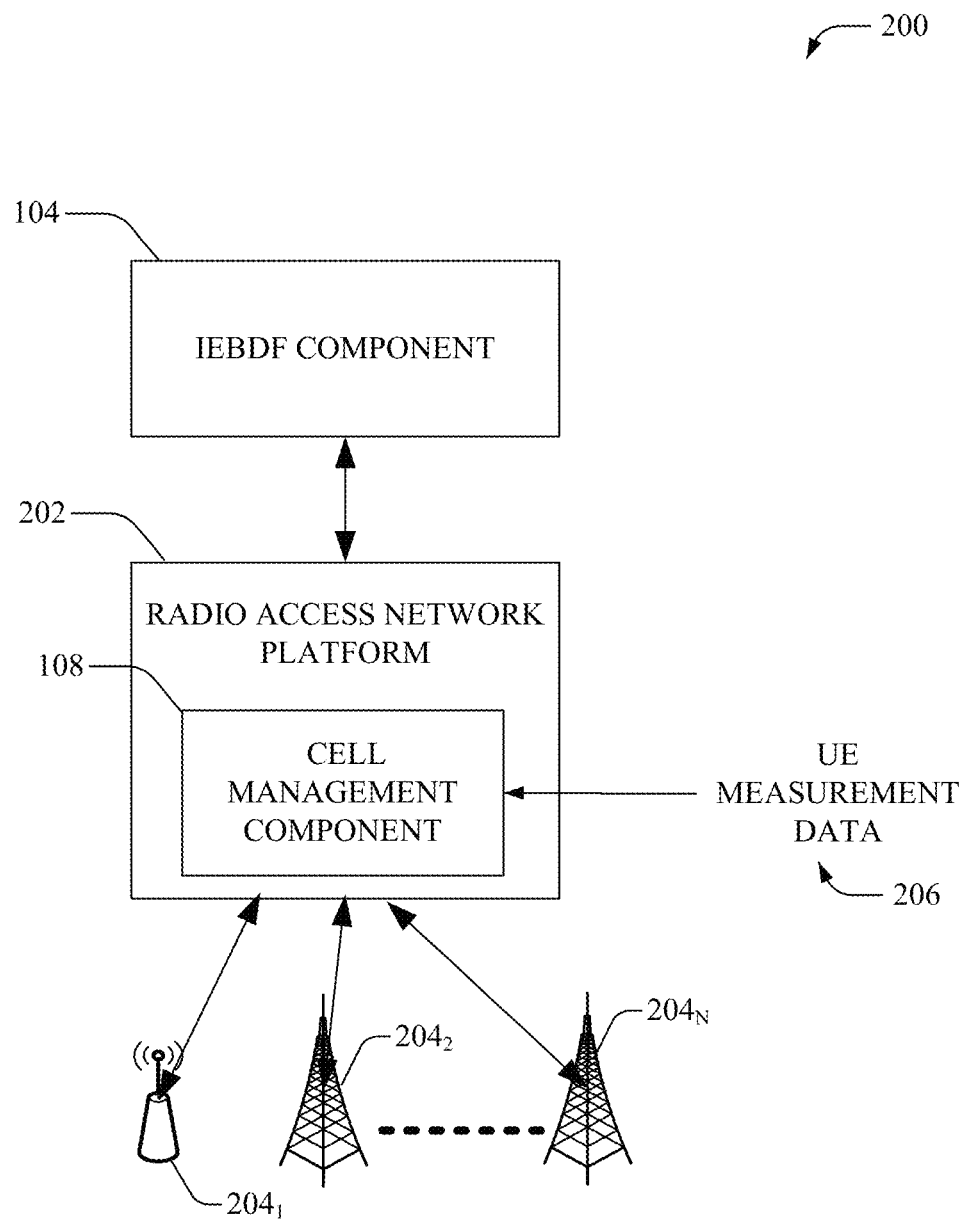
FIGS. 2A-2C illustrate example systems for real-time detection of sudden changes in network demand in a specific area.
Figure 2B:
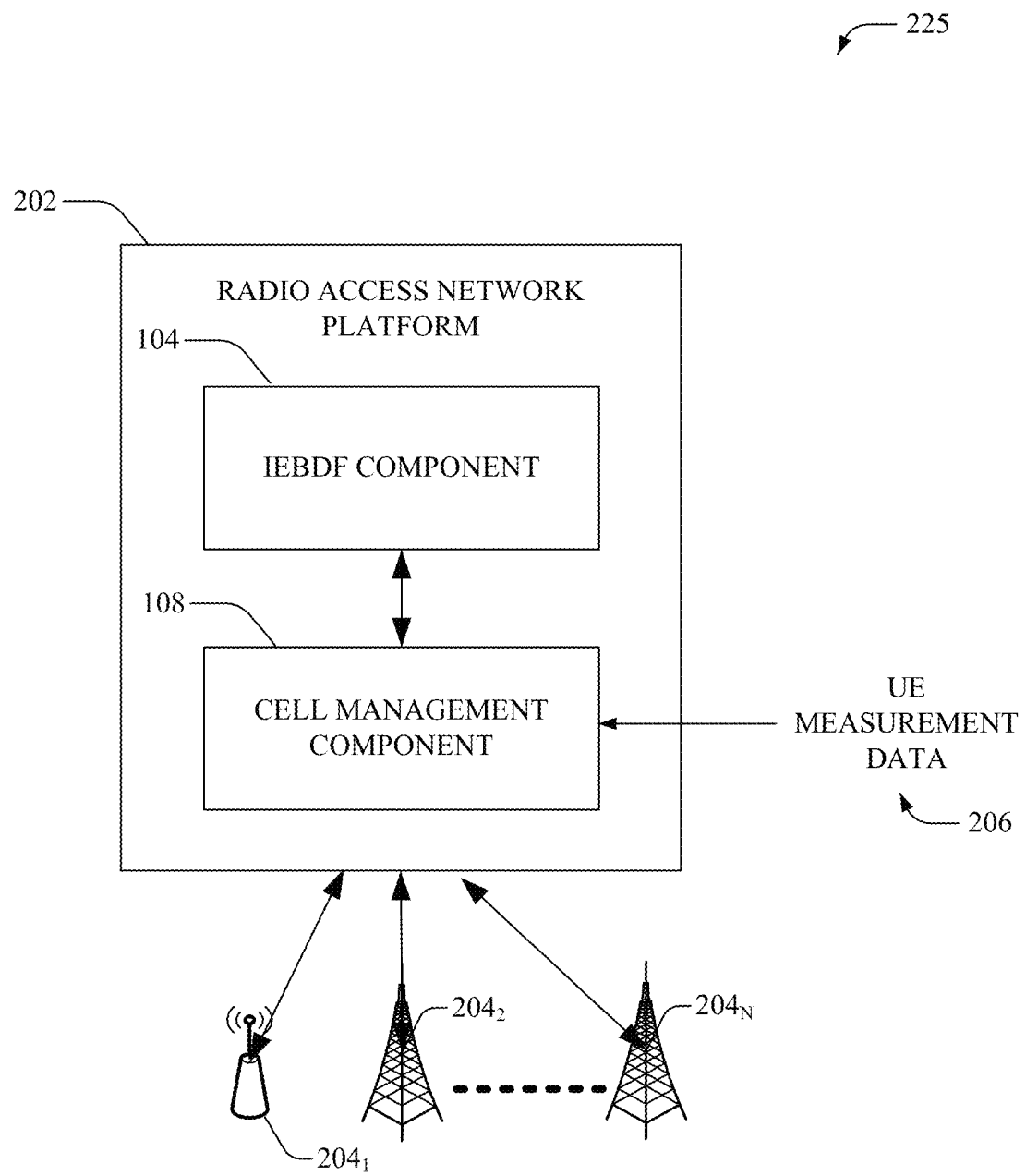
Figure 2C:
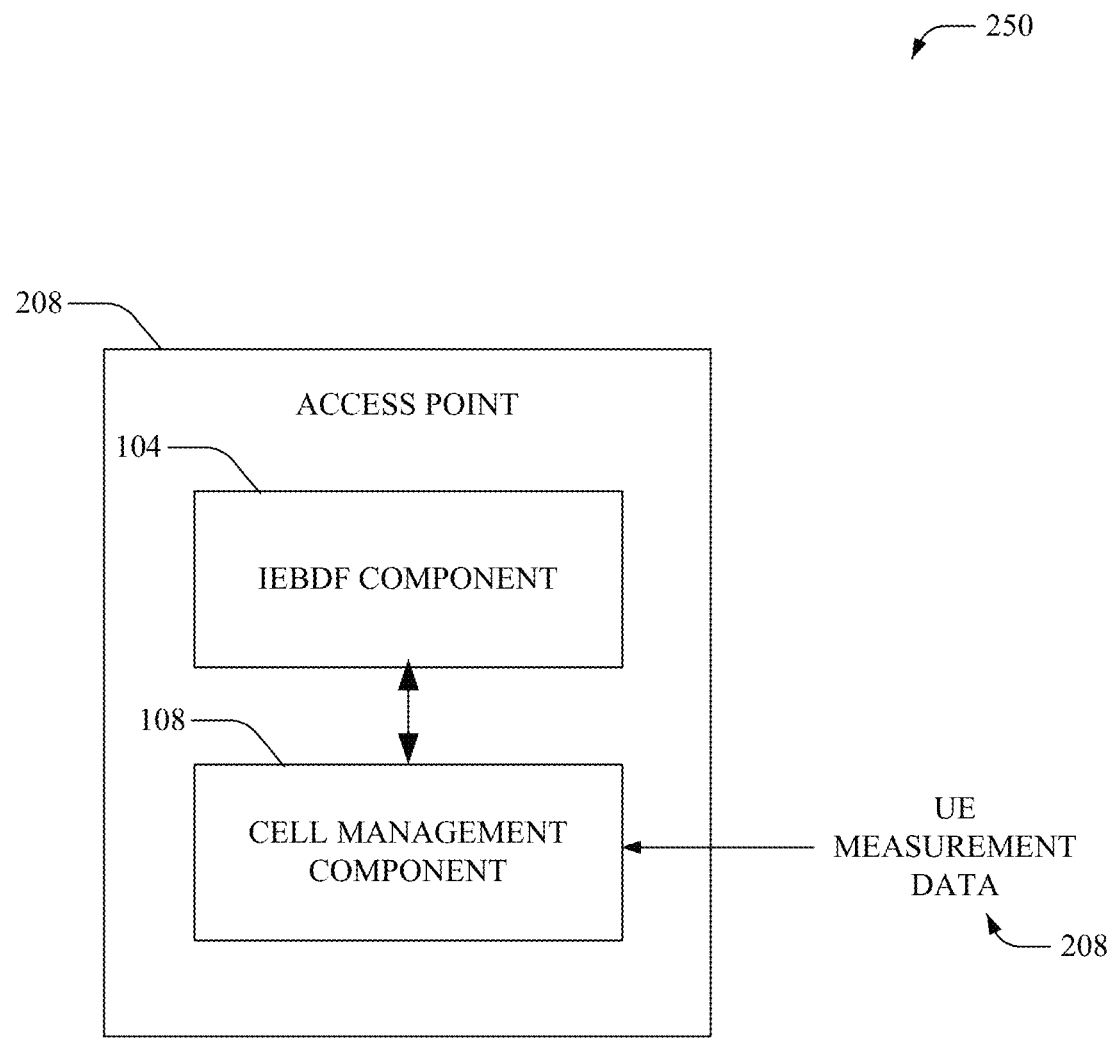

Referring now to FIGS. 2A-2C, there illustrated are example systems (200, 225, and 250) for real-time detection of sudden changes (e.g., traffic surges) in network demand in a specific area, according to an aspect of the subject disclosure. The system 200 can be included within a wireless communication network (e.g., cellular telecommunication network). It is noted that the IEBDF component 104 and the cell management component 108 can include functionality, as more fully described herein, for example, with regard to system 100.

FIG. 2A depicts an example embodiment wherein the cell management component 108 resides within a radio access network (RAN) platform 202. As an example, the RAN platform 202 can include one or more RAN controllers that manage communications associated with a set of access points, such as, access points $204_1$-$204_N$ (wherein N is most any positive integer) that provide network coverage that is generally intended for servicing wireless mobile devices. In one aspect, access points $204_1$-$204_N$ can include different types (or the same type) of access points, such as, but not limited to, a femto access point (e.g., access point $204_1$) and/or macro access points (e.g., access point $204_1$). Communication (e.g., voice and/or data traffic, instructions and/or control data, etc.) between the RAN platform 202 and the access points $204_1$-$204_N$ can be routed through respective backhaul broadband wired networks, for example, an optical fiber backbone, twisted-pair line, T1/E1 phone line, Digital Subscriber Cable (DSL), coaxial cable, etc., and/or wirelessly through wireless links.

Example system 225 comprises the IEBDF component 104 that can include a low-cost sensing device that senses nearby UE activity/density. In one embodiment, the IEBDF component 104 can determine changes (e.g., sudden increase) in network demand at specific locations. In one example, the IEBDF component 104 can monitor UE activity in low-coverage/capacity and/or no-coverage areas (e.g., coverage holes, dead zones). Oftentimes it is not economical for service providers to provide network coverage in certain low density/low demand area (e.g., rural areas, national forest, lightly populated areas, etc.). However, traffic demand in these areas can suddenly change, for example, during a natural disaster, national security threat, criminal activity, or most any event that gathers large crowds. Additionally or alternatively, traffic demand in high density areas (e.g., urban areas) with sufficient network coverage can also suddenly increase, for example, due to a special event (e.g., sports game, concert, parade, protest, etc.) leading to inefficient network capacity in the areas. The IEBDF component 104 can detect these sudden changes in network demand and provide real time updates to the cell management component 108. In one aspect, the IEBDF component 104 can scan (e.g., periodically, on demand, at a specified time, in response to detecting an event, etc.) the no-coverage areas to determine whether a large number (e.g., greater than a defined threshold) of UEs have moved into the no-coverage areas. As an example, the IEBDF component 104 can re-direct antenna beams of nearby access points (e.g., access points $204_1$-$204_N$) to provide radio frequency (RF) signals in the no-coverage areas for a short time period. During this time period, the IEBDF component 104 can scan and identify the number of UEs located within the no-coverage areas and provide this information to the cell management component 108. In another example, the IEBDF component 104 can provide the information to the cell management component 108 only when the number of UE exceeds a defined threshold. Similarly, IEBDF component 104 can identify the number of UE located within the densely populated areas and provide this information to the cell management component 108 (e.g., periodically, on demand, and/or only when the number of UE exceeds a defined threshold). Additionally or optionally, the IEBDF component 104 can also determine the type of UE activity, for example, determine whether the UEs are utilizing emergency service (e.g., initiating and/or attempting to initiate an emergency call) and/or how many UEs are utilizing the emergency service.

The cell management component 108 can analyze the UE activity data received from the IEBDF component 104 and can determine network coverage/capacity changes that are to be implemented to satisfy (e.g., completely or partially) the network demand changes. Although only one IEBDF component 104, is illustrated, it can be appreciated that the cell management component 108 can collect, aggregate UE activity data sensed by multiple IEBDF components deployed within the service provider's network. In one aspect, the cell management component 108 can be part of and/or coupled to a self organized network (SON) that is employed to optimize RAN network (e.g., adjust RAN coverage and/or capacity). Additionally or optionally, the cell management component 108 can receive and utilize measurement data 206 received from UE(s) located within (or previously located within) the specific areas to determine the network coverage/capacity changes. As an example, the measurement data 206 can include an RF profile indicative of a received signal strength indicator (RSSI), an angle of arrival (AoA), throughput and/or bandwidth measured by the UE(s). Moreover, the UE(s) can be coupled to access points $204_1$-$204_N$, the RAN platform 202, and/or disparate access points (not shown).

In one aspect, the cell management component 108 can identify one or more access points (e.g., access points $204_1$-$204_N$) that are close to (e.g., within a defined distance from) the specific area and instruct the access points (e.g., access points $204_1$-$204_N$) to steer one or more of their antenna beams in a direction towards the specific location. For example, the cell management component 108 can instruct an access point (e.g., access points $204_1$-$204_N$) to adjust an antenna facing direction (e.g., by employing smart beam forming) within the same cell (intra-cell) and/or from neighboring-cell (inter-cell) to increase and/or decrease the RAN capacity. Further, the cell management component 108 can instruct an access point (e.g., access points $204_1$-$204_N$) to adjust its transmitting power within the same cell (intra-cell) to and/or from neighboring-cell (inter-cell) to increase and/or decrease the RAN capacity. Furthermore, the cell management component 108 can instruct an access point (e.g., access points $204_1$-$204_N$) to modify the phase and/or relative amplitude of a signal transmitted at each transmitter of its antenna(s). Additionally or alternatively, the cell management component 108 can instruct the access point (e.g., access points $204_1$-$204_N$) to modify an antenna bearing and/or tilt suited for the satisfying the network demand at the specific location. Accordingly, the access point (e.g., access points $204_1$-$204_N$) can implement the requested modifications/adjustments. Typically, once the network demand decreases, for example, below a defined demand threshold, (e.g., after the event or rescue operations), the IEBDF component 104 (and/or the access point) can sense the reduced network demand and accordingly, the cell management component 108 can instruct the one or more access points (e.g., access points $204_1$-$204_N$) to revert their antenna beams back to their original positions.

FIG. 2B depicts an example system 225 wherein both the IEBDF component 104 and the cell management component 108 reside within the RAN platform 202. In this example, scenario, the IEBDF component 104 can comprise a low-cost sensing device that is part of the RAN platform 202. Further, FIG. 2C depicts an example system 250 wherein both the IEBDF component 104 and the cell management component 108 reside within an access point 208. In this example, scenario, the IEBDF component 104 can comprise a low-cost sensing device that is part of the access point 208. Moreover, the IEBDF component 104, the cell management component 108, RAN platform 202 and the access points $204_1$-$204_N$ can include functionality, as more fully described herein, for example, with regard to systems 100 and 200. In addition, access point 208 can be substantially similar to access points $204_1$-$204_N$ and can include functionality, as more fully described herein, for example, with regard to access points $204_1$-$204_N$.

Figure 3A:
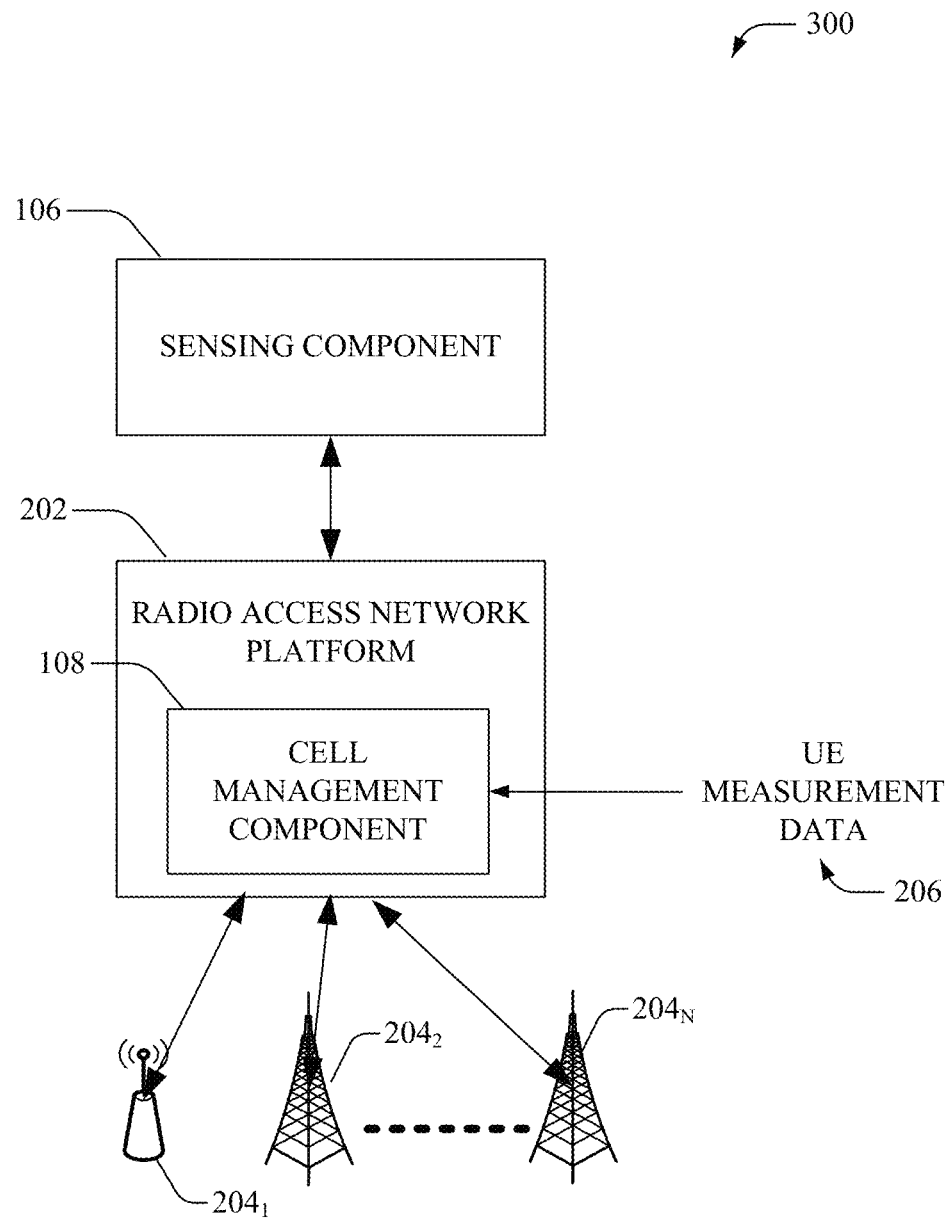
FIGS. 3A-3B illustrate example systems that leverage measurements obtained by one or more sensors to improve network coverage and/or capacity.
Figure 3B:
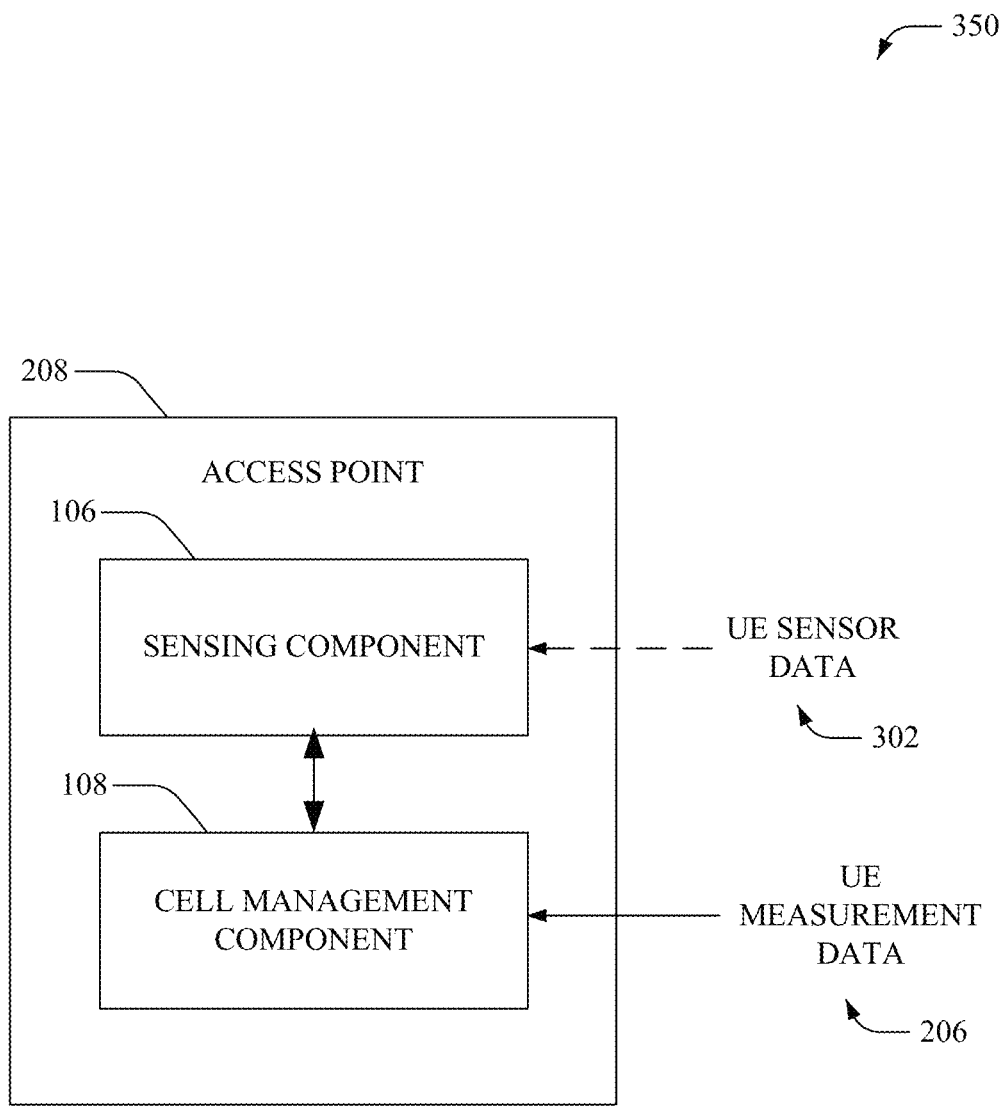

Referring now to FIGS. 3A and 3B, there illustrated are example systems 300 and 350 that leverage measurements obtained by one or more sensors (e.g., cluster sensors) to improve network coverage and/or capacity. Moreover, systems 300 and 350 provide a relatively simple and inexpensive approach to dynamically tune/steer antenna beams towards specific locations, for example, during emergency conditions. In one aspect, the systems 300 and 350 can utilize sensor data to quantify and locate areas of increased/high network demand. It is noted that the sensing component 106, the cell management component 108, the RAN platform 202, the access points $204_1$-$204_N$ and the access point 208 can include functionality, as more fully described herein, for example, with regard to systems 100, 200, 225, and 250.

According to an embodiment, the sensing component 106 can include (and/or be coupled to) one or more sensors, such as but not limited to, temperature sensors, weather sensors, wind sensors, sound sensors, optical sensors, rain/water sensors, motion/vibration/seismic sensors (e.g., to detect earthquakes), radio sensors, and the like. In one example, the sensors can be deployed at rural and/or low network demand locations. In another example, the sensors can be mobile (e.g., coupled to a connected vehicle). Typically, during extreme weather conditions and/or other natural (or man-made) disasters, low network demand areas can suddenly get populated with a large number of UEs and a surge in network demand can be observed. For example, emergency calls can be made by disaster victims, rescue and/or search personnel, law enforcement personnel, etc. In one aspect, the sensing component 106 can detect changes in the various sensed parameters and provide real time updates to the cell management component 108. In another aspect, the sensing component 106 can provide the information relating to the changed parameters to the cell management component 108 only when the parameters exceed defined thresholds.

The cell management component 108 can analyze the parameter data received from the sensing component 106 and can determine network coverage/capacity changes that are to be implemented to satisfy (e.g., completely or partially) the network demand changes. Additionally or optionally, the cell management component 108 can receive and utilize measurement data 206 received from UE(s) within (or previously located within) the areas at which the sensors are deployed to optimize the network coverage/capacity changes. Moreover, the cell management component 108 can transmit/deliver instructions to one or more access points $204_1$-$204_N$ for beam steering, for example, by changing bearing and/or tilt, of their antennas towards the areas specified by the sensing component 106. Additionally or optionally, the cell management component 108 can transmit/deliver instructions to one or more access points $204_1$-$204_N$ for modifying a transmission power of their antennas. The one or more access points $204_1$-$204_N$ can be selected based on various factors, such as, but not limited to, their geographical location, available bandwidth, antenna configurations, etc. As an example, the access points $204_1$-$204_N$ can utilize most any beam forming and steering techniques, for example, a delay-and-sum scheme, a null-steering scheme, a frequency domain scheme, etc. Oftentimes, a phased array antenna can be utilized within the access points $204_1$-$204_N$, which can include one or more radiating elements, each having a phase shifter. Moreover, antenna beams can be formed by shifting the phase of the signal emitted from each radiating element, to provide constructive/destructive interference to steer the beams in the targeted direction. In one example, after adjustment the antenna beams can be steered back to an original or default position/direction, for example, on expiration of a predefined time period, on detection (e.g., by the sensing component 106) that the network demand has decreased. Moreover, the analysis and evaluation, by the cell management component 108, can be repeated and/or updated each time the sensing component 106 reports network demand changes.

FIG. 3A illustrates an example system 300 wherein the sensing component 106 (and the sensor(s)) is coupled (e.g., via a wired and/or wireless link) to the RAN platform 202, while FIG. 3B illustrates an example system 350 wherein the sensing component 106 resides within the access point 208. In system 350, the sensor(s) can be part of (and/or coupled to) the access point 208. Additionally or alternatively, the sensor(s) can be located on the UEs can sensor data 302 can be transmitted from the UEs to the access point 208, for example, periodically, on demand, in response to detecting an event, during registration/attachment, etc.

Figure 4A:
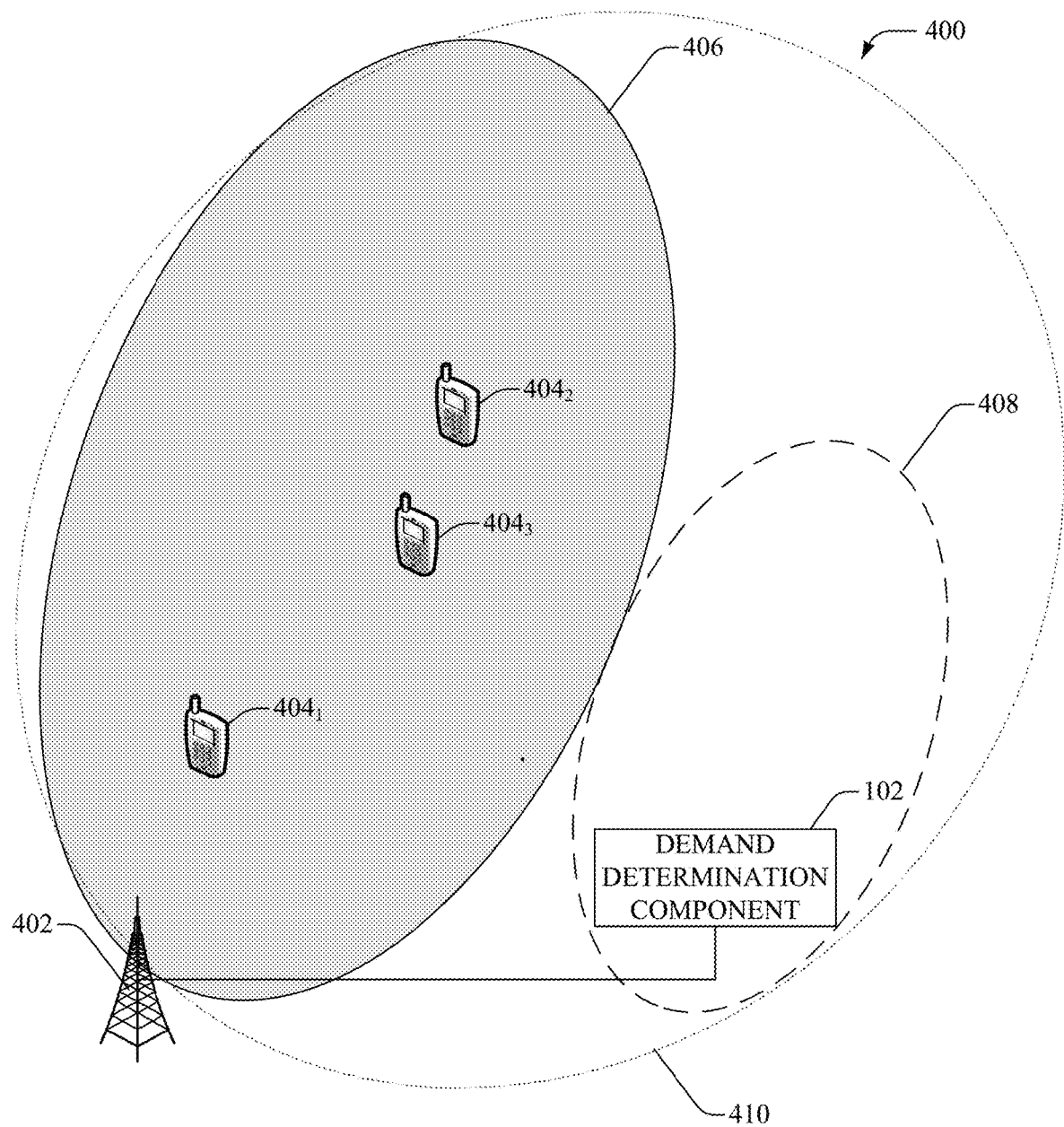
FIGS. 4A-B illustrate example systems that can adjust network coverage and/or capacity based on event-driven network demand.
Figure 4B:
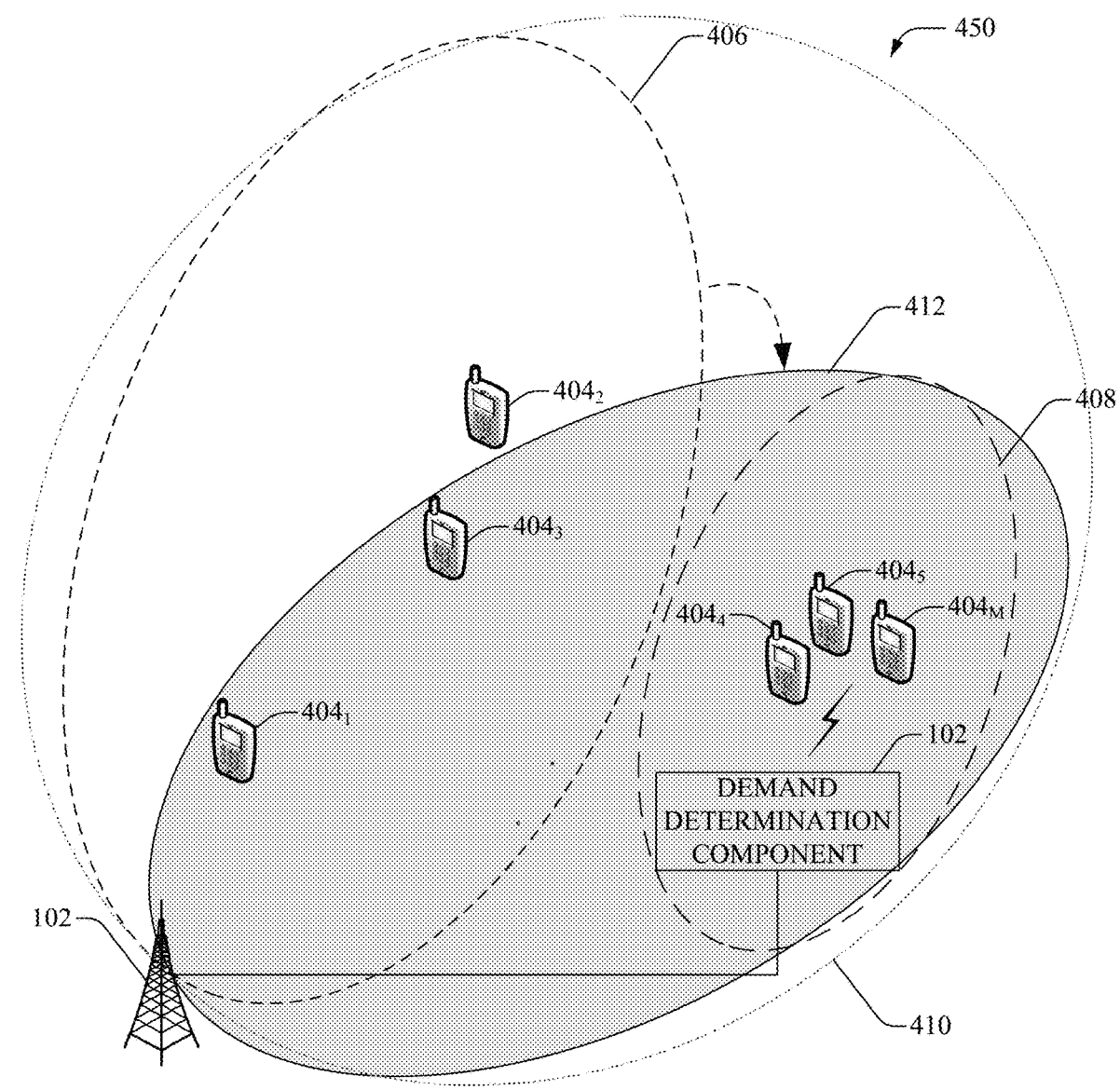

Referring now to FIGS. 4A and 4B, there illustrated are example systems 400 and 450 that can adjust network coverage and/or capacity based on event-driven network demand, according to an aspect of the subject disclosure. Moreover, the access point 402 can be substantially similar to access points $204_1$-$204_N$ and can include functionality, as more fully described herein, for example, with regard to systems 100-350. Further, the demand determination component 102 can include functionality, as more fully described herein, for example, with regard to system 100. In one aspect, the access point 402, can serve UEs $404_1$-$404_3$ within a coverage area 406. Area 408 can be a low density, rural, low population area that typically, has no (or very poor) network coverage. In one aspect, the demand determination component 102 can monitor network demand within the area 408, for example, based on monitoring UE activity (e.g., by employing the IEBDF component 104) and/or monitoring environmental conditions (e.g., by employing the sensing component 106). Although depicted as being coupled to the access point 402, it is noted that the demand determination component 102 can reside (e.g., completely or partially) within the access point 402 (and/or RAN platform 202). As shown in FIG. 4A, if UE activity and/or environmental conditions do not satisfy respective defined criteria (e.g., no UE activity in area 408 and/or no extreme environmental conditions in area 408 exist), the antenna beam of access point 402 can remain unchanged and continue to serve the UEs $404_1$-$404_3$ within the coverage area 406.

FIG. 4B illustrates an example scenario, wherein the demand determination component 102 senses UE activity (e.g., presence of UEs $404_4$-$404_M$; wherein M is most any positive integer) within the area 408 and/or senses that an environmental condition satisfies the defined criterion (e.g., a natural disaster/event has occurred or is about to occur). The demand determination component 102 provides this information to the cell management component 108 that analyzes the information and determines an optimal antenna configuration to serve the area 408. As an example, the access point 402 can comprises antenna array(s) that serve a fixed coverage layer 410, including a steerable capacity layer. Moreover, the cell management component 108 can instruct the access point 402 to reconfigure (e.g., redirect) the antenna array(s) to focus the antenna beam towards the area 408. Accordingly, the access point 402 can be focus its antenna beam on and/or directed its antenna beam towards area 408 (e.g., provide coverage area 412) to serve and/or increase network capacity for UEs $404_4$-$404_M$.

Although only six UEs are illustrated, it can be appreciated that the subject disclosure is not that limited and a greater or lesser number of UEs can be present within the coverage areas. It can be appreciated that the UEs ($404_1$-$404_M$) disclosed herein can include most any electronic communication devices such as, but not limited to, most any consumer electronic devices, for example, a cellular phone, a personal computer, a tablet computer, a personal digital assistant (PDA), a smart phone, a laptop, a digital media player, a wearable device, a digital camera, a gaming system, etc. It can be appreciated that the UE(s) can be mobile, have limited mobility and/or be stationary. Further, although only one access point is depicted, it can be appreciated that the subject disclosure is not that limited and that beams of multiple access points can be adjusted to serve area 408.

Figure 5:
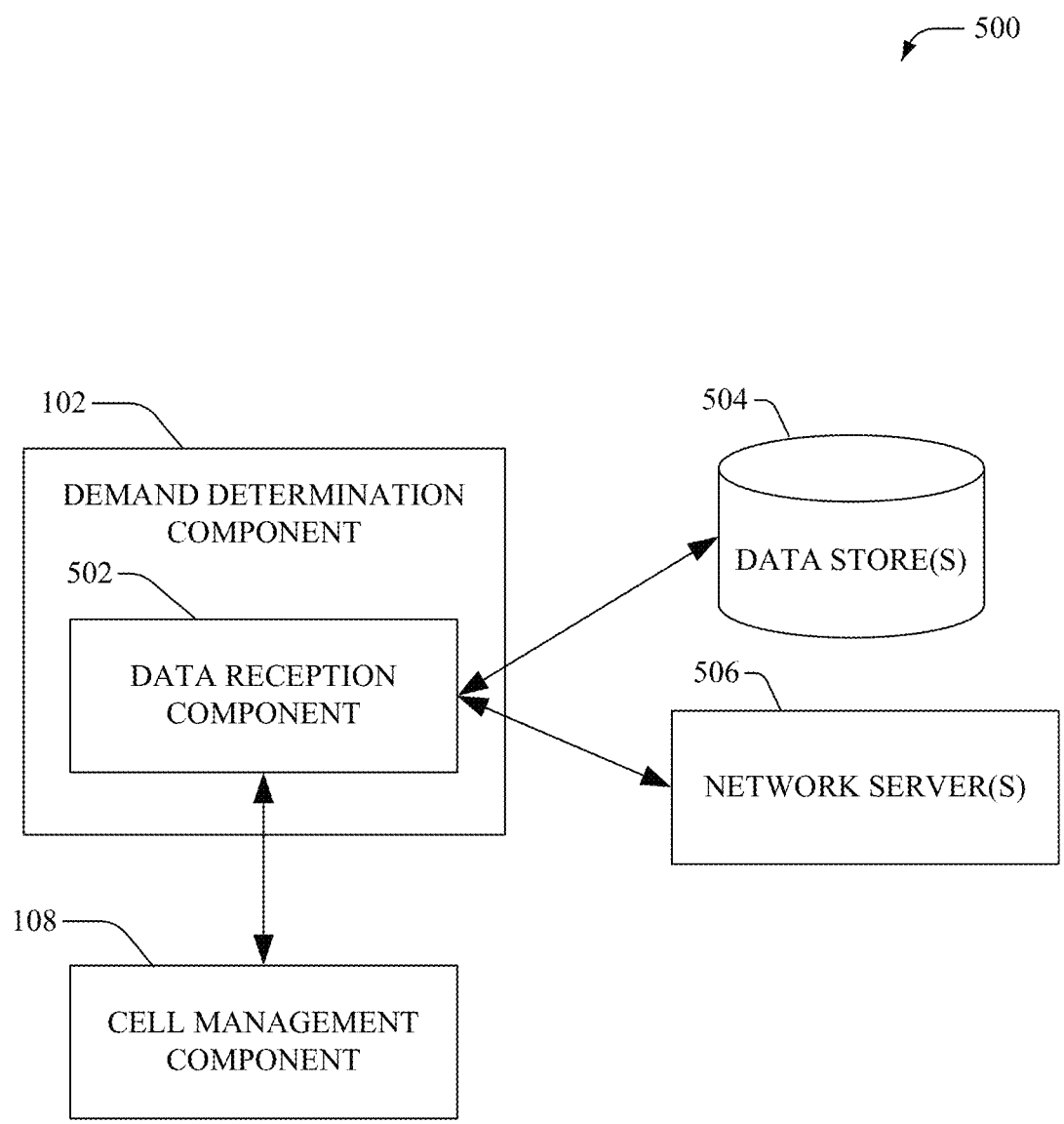
FIG. 5 illustrates an example system for receiving network demand data in accordance with the subject specification.

FIG. 5 illustrates an example system 500 that facilitates receiving network demand data in accordance with the subject specification. According to an embodiment, the demand determination component can include a data reception component 502 that extract network demand data from various network devices, such as, but not limited to, data store(s) 504 and/or network server(s) 506. As an example, the data reception component 502 can be coupled to the RAN platform 202, reside (e.g., completely or partially) within the RAN platform 202, and/or reside (e.g., completely or partially) within the access point 208. The demand determination component 102 and the cell management component 108 can include functionality, as more fully described herein, for example, with regard to system 100-350.

The data reception component 502 can receive event data and/or network demand data from the data store(s) 504 (e.g., content provider data stores) and/or network server(s) 506 (e.g., web servers, application servers, public/private clouds, etc.) in a push and/or pull configuration, for example, periodically, on demand, in response to detection of an event, at a specified time, based on an operator policy, etc. The event data and/or network demand data can include timing data and/or location data. Further, the event data and/or network demand data can include real time information (e.g., news, weather, public safety announcements, etc.), predicted information (e.g., weather forecasts) and/or scheduled information (e.g., scheduled concerts, parades, games, and the like). In one aspect, the data reception component 502 can aggregate the received information to determine areas and time periods during which the areas would experience high network demands (e.g., above a defined demand threshold). Based on this information, the cell management component 108 can determine network coverage/capacity changes that are to be implemented to satisfy (e.g., at least a portion of) the high network demand. Further, the cell management component 108 can select one or more access points located near the areas and instruct the one or more access points to adjust their antenna configurations to serve (and/or increase capacity at) the areas for the determined time periods. It is noted that the data store 504 can include volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 6:
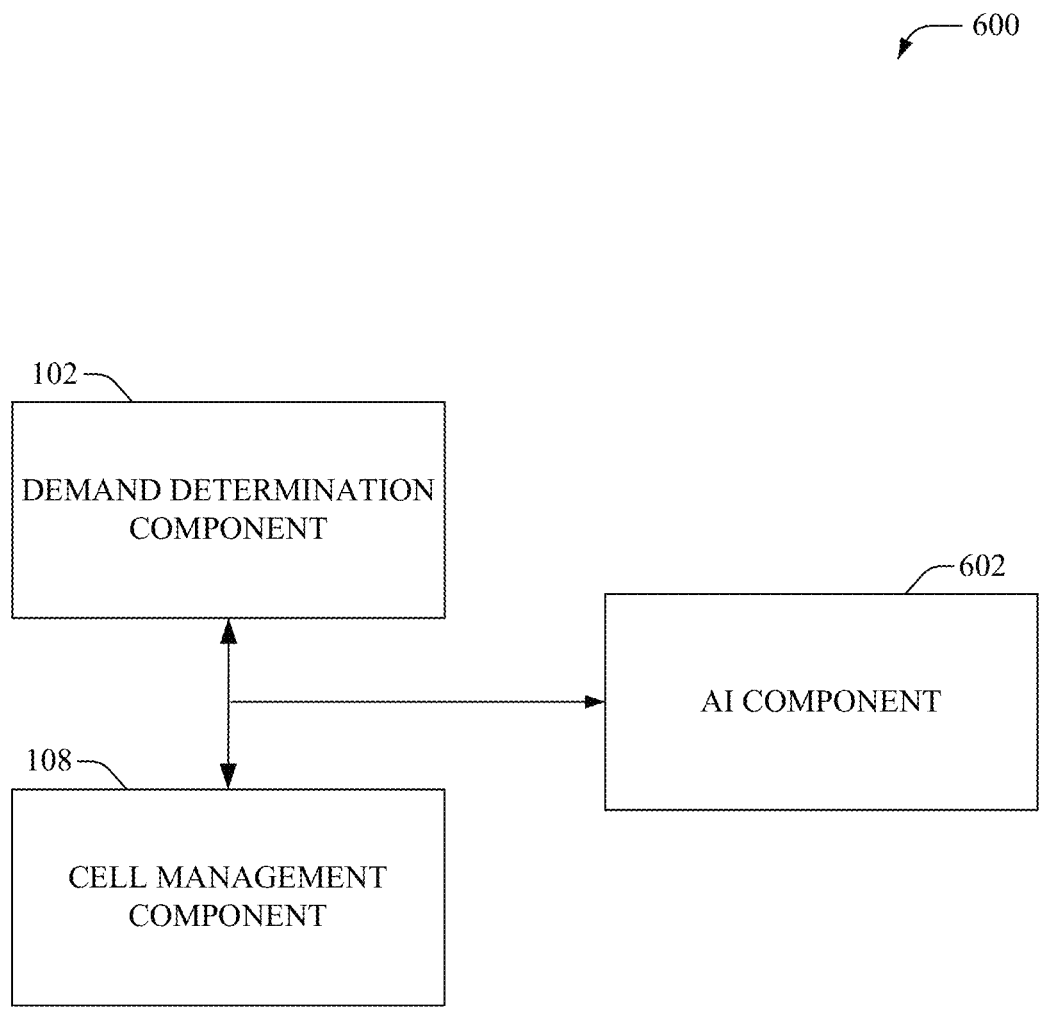
FIG. 6 illustrates an example system that facilitates automating one or more features in accordance with the subject disclosure.

Referring now to FIG. 6, there illustrated is an example system 600 that employs an artificial intelligence (AI) component 602, which facilitates automating one or more features. It can be appreciated that the demand determination component 102 and the cell management component 108 can include respective functionality, as more fully described herein, for example, with regard to systems 100-500. An example embodiment, system 600 (e.g., in connection with automatically identifying changes in network demand and/or optimal antenna configuration parameters) can employ various AI-based schemes for carrying out various aspects thereof. For example, a process for determining a location of the network demand surge, parameters to steer an antenna beam of an access point, a schedule to sense and/or receive environmental data, etc., can be facilitated via an automatic classifier system and process.

Moreover, the classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs/sensors/access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing UE behavior, environmental data, operator preferences, historical information, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria a location and/or time period during which a sudden change in network demand is observed, one or more access points that can best serve the location, parameters (e.g., antenna bearing, tilt, phase, transmission power, etc.) for configuring an antenna beam, etc. The criteria can include, but is not limited to, historical patterns, UE behavior, user preferences, service provider preferences and/or policies, environmental parameters/reports, location of the access points, etc.

Figure 7:
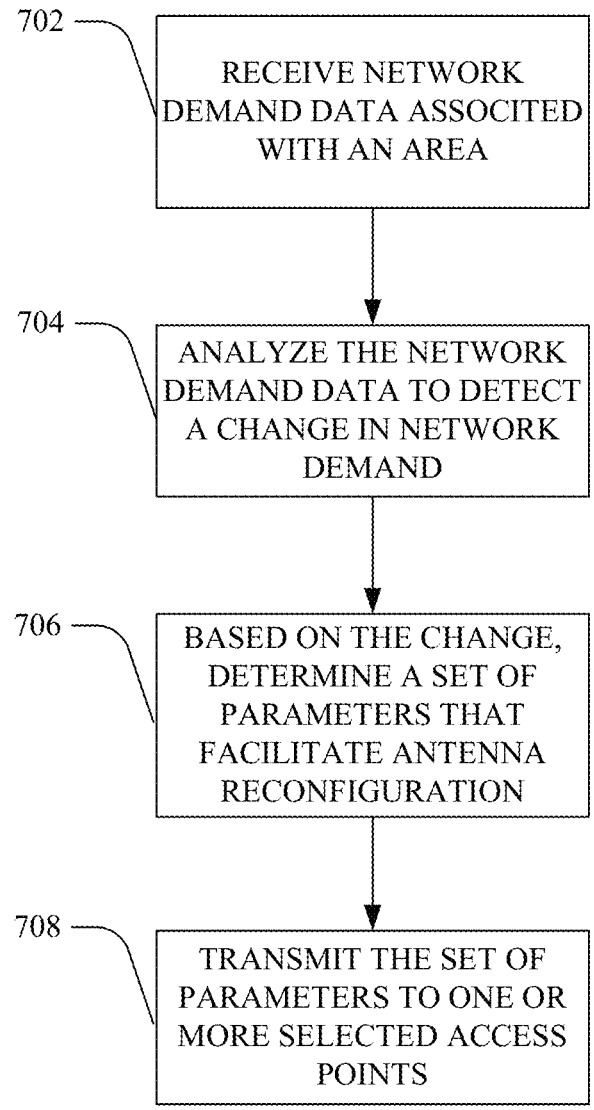
FIG. 7 illustrates an example method that facilitates event-driven network demand detection.

FIG. 7 illustrates methodologies and/or flow diagrams in accordance with the disclosed subject matter. For simplicity of explanation, the methodologies are depicted and described as a series of acts. It is to be understood and appreciated that the subject specification is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 7, illustrated is an example method 700 that facilitates event-driven network demand detection, according to an aspect of the subject specification. Method 700 can enable dynamic and efficient beam steering and improve network quality perceived by UEs located in high demand areas. At 702, network demand data associated with an area can be received. The area can include a no-coverage area and/or an area with existing network coverage. As an example, the network demand data can include UE activity data (e.g., monitored by IEBDF component 104), sensor data associated with environmental conditions, such as, but not limited to, weather, sound, video, etc. (e.g., monitored by sensing component 106), real time information (e.g., news, weather, etc.), predicted information (e.g., weather forecasts), and/or scheduled event information (e.g., scheduled concerts, parades, games, and the like) (e.g., received from network servers 506 and/or data stores 504). At 704, the network demand data can be analyzed to detect a change in network demand (e.g., a surge or spike), for example, based on comparison with a predefined network demand threshold or range. At 706, based on the change, a set of parameters that facilitate antenna reconfiguration can be determined. As an example, the parameters can include, but are not limited to, transmission power, antenna bearing, antenna tilt, antenna phase, etc. At 708, the set of parameters can be transmitted to one or more selected access points. As an example, the access points can be selected based on their proximity to the area, available bandwidth, and/or throughput, etc. Moreover, the access points can utilize the set of parameters to increase capacity and/or modify coverage patterns such that the network demand can be satisfied (e.g., completely or partially).

Figure 8:
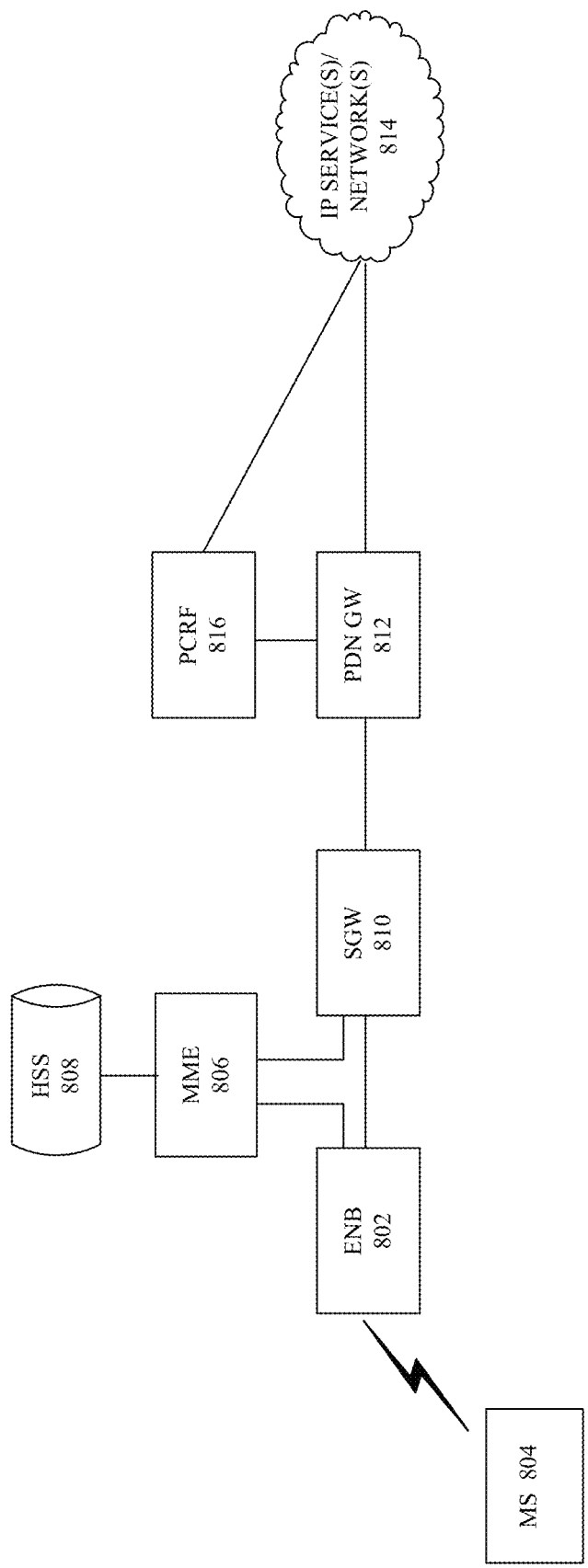
FIG. 8 illustrates a Long Term Evolution (LTE) network architecture that can employ the disclosed architecture.
Figure 9:
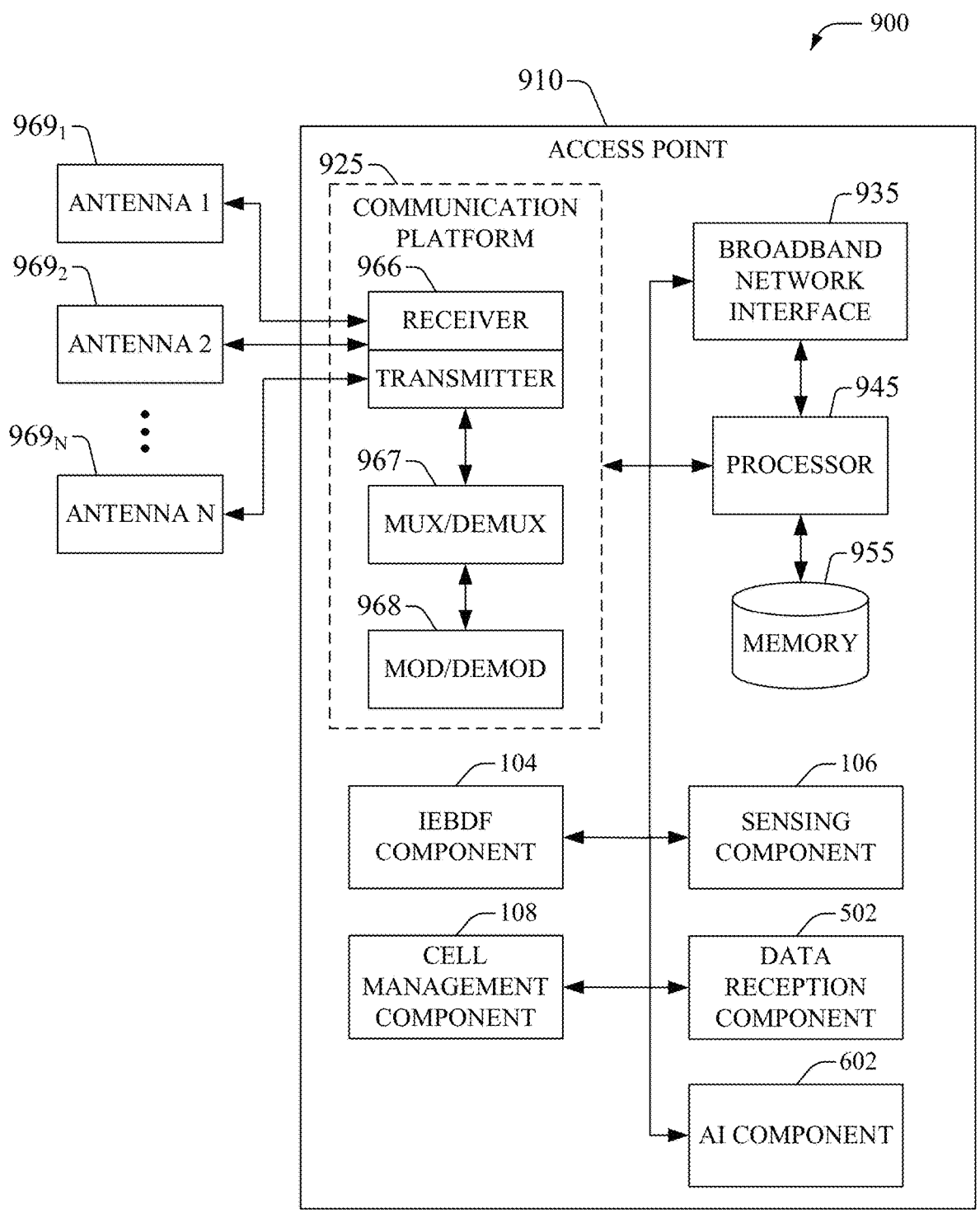
FIG. 9 illustrates an example embodiment of an access point that can facilitate network coverage and/or capacity planning based on event-driven network demand detection.

To provide further context for various aspects of the subject specification, FIGS. 8 and 9 illustrate, respectively, an example wireless communication environment 800, with associated components that facilitates event-driven network demand detection, and a block diagram of an example embodiment 900 of an access point, which can facilitate event-driven network demand detection in accordance with aspects described herein.

FIG. 8 illustrates a high-level block diagram that depicts an example LTE network architecture 800 that can employ the disclosed communication architecture. The evolved RAN for LTE consists of an eNodeB (eNB) 802 that can facilitate connection of MS 804 to an evolved packet core (EPC) network. In one aspect, the MS 804 is physical equipment or Mobile Equipment (ME), such as a mobile phone or a laptop computer that is used by mobile subscribers, with a Subscriber identity Module (SIM). The MS 804 includes an embedded client that receives and processes messages received by the MS 804. As an example, the embedded client can be implemented in JAVA. It is noted that MS 804 can be substantially similar to UEs $404_1$-$404_N$, and can include functionality described with respect to UEs $404_1$-$404_M$. In one aspect, the MS 804 can be can include sensors (e.g., cluster sensors) that can monitor environmental conditions, such as, but not limited to, weather, sounds, videos, motion, etc. In addition, MS 804 can determine measurement data, including, but not limited to, RSSI, AoA, throughput and/or bandwidth associated with signal(s) received from an access point (e.g., eNB 802). The measurement data can be provided to a cell management component 108 to facilitate antenna reconfiguration.

The connection of the MS 804 to the evolved packet core (EPC) network is subsequent to an authentication, for example, a SIM-based authentication between the MS 804 and the evolved packet core (EPC) network. In one aspect, the MME 806 provides authentication of the MS 804 by interacting with the HSS 808. The HSS 808 contains a subscriber profile and keeps track of which core network node is currently handling the subscriber. It also supports subscriber authentication and authorization functions (AAA). In networks with more than one HSS 808, a subscriber location function provides information on the HSS 808 that contains the profile of a given subscriber.

As an example, the eNB 802 can host a PHYsical (PHY), Medium Access Control (MAC), Radio Link Control (RLC), and Packet Data Control Protocol (PDCP) layers that include the functionality of user-plane header-compression and encryption. In addition, the eNB 802 can implement at least in part Radio Resource Control (RRC) functionality (e.g., radio resource management, admission control, scheduling, cell information broadcast, etc.). The eNB 802 can be coupled to a serving gateway (SGW) 810 that facilitates routing of user data packets and serves as a local mobility anchor for data bearers when the MS 804 moves between eNBs. In addition, the SGW 810 can act as an anchor for mobility between LTE and other 3GPP technologies (GPRS, UMTS, etc.). When MS 804 is in an idle state, the SGW 810 terminates a downlink (DL) data path and triggers paging when DL data arrives for the MS 804. Further, the SGW 810 can perform various administrative functions in the visited network such as collecting information for charging and lawful interception.

In one aspect, the SGW 810 can be coupled to a Packet Data Network Gateway (PDN GW) 812 that provides connectivity between the MS 804 and external packet data networks such as IP service(s)/network(s) 814. Moreover, the PDN GW 812 is a point of exit and entry of traffic for the MS 804. It is noted that the MS 804 can have simultaneous connectivity with more than one PDN GW (not shown) for accessing multiple PDNs. The PDN GW 812 performs IP address allocation for the MS 804, as well as QoS enforcement and implements flow-based charging according to rules from a Policy Control and Charging Rules Function (PCRF) 816. The PCRF 816 can facilitate policy control decision-making and control flow-based charging functionalities in a Policy Control Enforcement Function (PCEF), which resides in the PDN GW 812. The PCRF 816 can store data (e.g., QoS class identifier and/or bit rates) that facilitates QoS authorization of data flows within the PCEF. In one aspect, the PDN GW 812 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO). Although a LTE network architecture 800 is described and illustrated herein, it is noted that most any communication network architecture can be utilized to implement the disclosed embodiments.

With respect to FIG. 9, in example embodiment 900, access point 910 can receive and transmit signal(s) (e.g., traffic and control signals) from and to wireless devices, access terminals, wireless ports and routers, etc., through a set of antennas $969_1$-$969_N$. It should be appreciated that while antennas $969_1$-$969_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 includes a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Access point 910 also includes a processor 945 configured to confer functionality, at least partially, to substantially any electronic component in the access point 910, in accordance with aspects of the subject disclosure. In particular, processor 945 can facilitate access point 910 to implement configuration instructions received through communication platform 925, which can include storing data in memory 955. In addition, processor 945 facilitates access point 910 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 945 can manipulate antennas $969_1$-$969_N$ to facilitate beamforming or selective radiation pattern formation, which can benefit specific locations (e.g., basement, home office . . . ) covered by access point; and exploit substantially any other advantages associated with smart-antenna technology. Memory 955 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 955 can store configuration information such as schedules and policies; access point address(es) or geographical indicator(s); access lists (e.g., white lists); license(s) for utilization of add-features for access point 910, and so forth.

In embodiment 900, processor 945 is coupled to the memory 955 in order to store and retrieve information necessary to operate and/or confer functionality to communication platform 925, broadband network interface 935 (e.g., a broadband modem), and other operational components (e.g., multimode chipset(s), power supply sources . . . ; not shown) that support the access point 910. In one embodiment, the access point 910 can further include the IEBDF component 104, the sensing component 106, the cell management component 108, the data reception component 502, and/or the AI component 602, which can include functionality, as more fully described herein, for example, with regard to systems 100-600. In addition, it is to be noted that the various aspects disclosed in the subject specification can also be implemented through (i) program modules stored in a computer-readable storage medium or memory (e.g., memory 955) and executed by a processor (e.g., processor 945), or (ii) other combination(s) of hardware and software, or hardware and firmware. Access points $204_1$-$204_N$, access point 208, and access point 402, can be substantially similar to, and can include at least a portion of the functionality described with reference to, access point 910.

Figure 10:
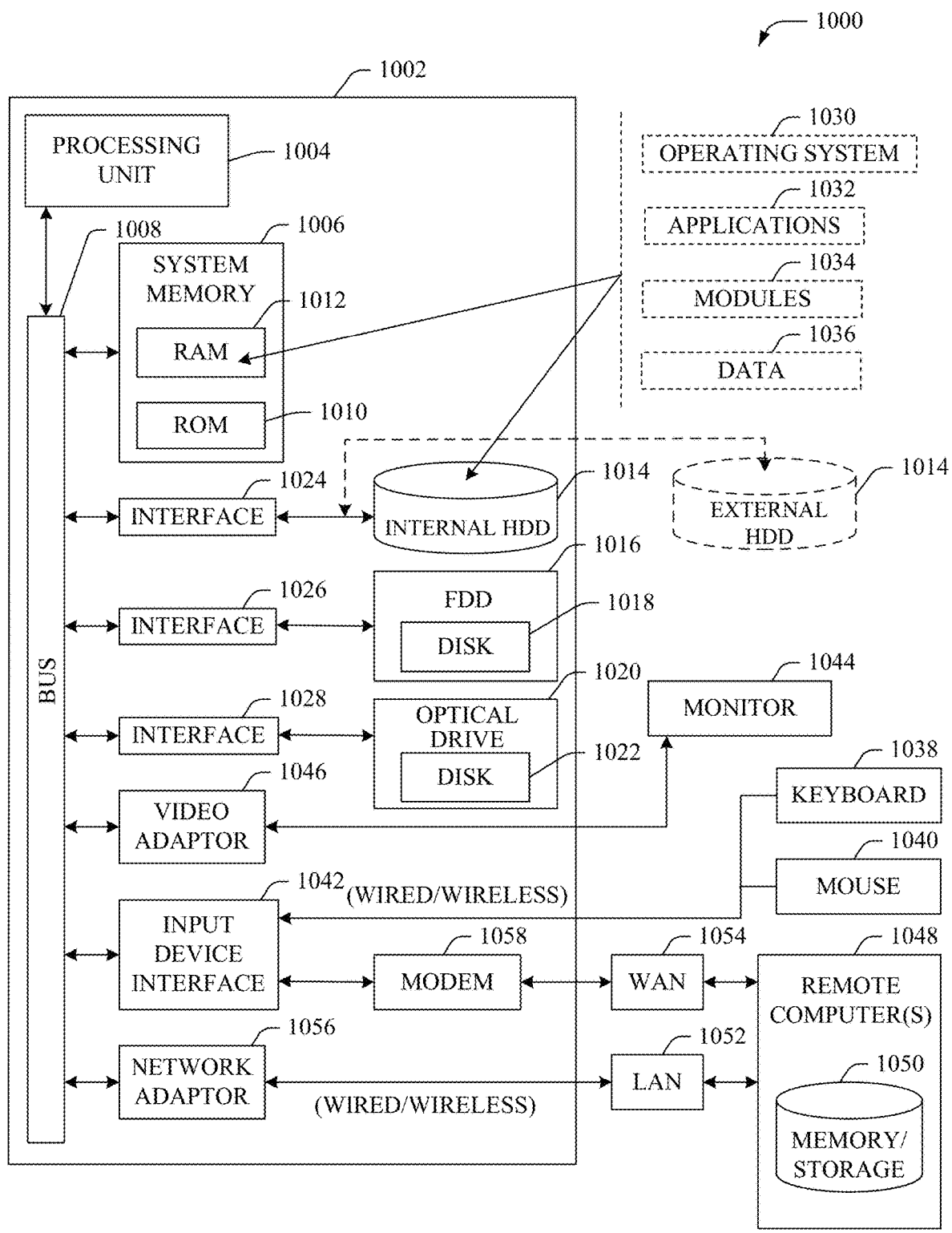
FIG. 10 illustrates a block diagram of a computer operable to execute the disclosed communication architecture.

Referring now to FIG. 10, there is illustrated a block diagram of a computer operable to execute the disclosed communication architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), equipment, system(s), platform(s), and/or device(s) (e.g., demand determination component 102, IEBDF component 104, sensing component 106, cell management component 108, RAN platform 202, access points $204_1$-$204_N$, access point 208, access point 402, UEs $404_1$-$404_M$, data reception component 502, network server(s) 506, data store 504, AI component 602, MS 804, eNB 802, MME 806, SGW 810, PDN GW 812, PCRF 816, access point 910, etc.) disclosed herein with respect to system 100-600 and 800-900 can each include at least a portion of the computer 1302. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040 or a touchscreen or touchpad (not illustrated). Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network device, comprising:
   a processor; and
   a memory that stores executable instructions that, when executed by the processor, facilitate performance of operations, comprising:
      facilitating a radio frequency scan within a defined geographical area, wherein the defined geographical area comprises a portion of a coverage area of an access point device;
      based on a result of the radio frequency scan, identifying a group of user equipment that are located within the defined geographical area;
      based on monitoring respective call activities of the group of user equipment, determining a quantity of the group of user equipment that have initiated an emergency service; and
      in response to determining that the quantity of the group of user equipment that have initiated the emergency service exceeds a threshold quantity, facilitating a modification of a signal transmitted via an antenna of the access point device to increase network coverage in the defined geographical area.

2. The network device of claim 1, wherein the modification comprises a change to a beam of the antenna associated with the signal to focus the beam within the defined geographical area to increase the network coverage.

3. The network device of claim 1, wherein the modification comprises a change of a relative amplitude of the signal transmitted via the antenna.

4. The network device of claim 1, wherein the facilitating the modification comprises facilitating the modification based on sensor data representing an environmental condition associated with the defined geographical area.

5. The network device of claim 4, wherein the environmental condition comprises a weather condition.

6. The network device of claim 4, wherein the environmental condition comprises a seismic condition.

7. The network device of claim 4, wherein the sensor data is received from a cluster sensor coupled to the access point device.

8. The network device of claim 4, wherein the sensor data is received from a mobile sensor device.

9. The network device of claim 4, wherein the sensor data is received from a sensor of a user equipment served by the access point device.

10. The network device of claim 1, wherein the modification comprises a change of relative phases of radio frequency signals driving elements of the antenna.

11. The network device of claim 4, wherein the sensor data comprises audio data received from an audio sensor device.

12. The network device of claim 1, wherein the defined geographical area comprises an area without network coverage and wherein the operations further comprise:
instructing the access point device to direct an antenna beam from a first coverage area to the defined geographical area for a defined time period during which the radio frequency scan is performed; and
in response to determining that the time period has expired, instructing the access point device to re-direct the antenna beam to the first coverage area.

13. A method, comprising:
initiating, by a network device comprising a processor, a radio frequency scan within a defined geographical area, wherein a result of the radio frequency scan comprises data indicative of a group of user equipment located within the defined geographical area, and wherein the defined geographical area comprises a portion of a coverage area of an access point device; and
based on monitoring respective call activities of the group of user equipment, determining a quantity of the group of user equipment that have initiated an emergency service; and
in response to determining that the quantity of the group of user equipment that have initiated the emergency service exceeds a threshold quantity, facilitating an adjustment of a relative amplitude of a signal transmitted via an antenna of the access point device to modify network coverage in the defined geographical area.

14. The method of claim 13, wherein the facilitating the adjustment comprises facilitating the adjustment based on determining that sensor data, received from an acoustic sensor associated with the defined geographical area, satisfies a defined sensing criterion.

15. The method of claim 13, wherein the determining the facilitating the adjustment comprises facilitating the adjustment based on determining that sensor data representing an environmental condition associated with the defined geographical area satisfies a defined sensing criterion.

16. The method of claim 13, further comprising:
determining, by the network device, timing data indicative of a time period for which the relative amplitude is to be adjusted, wherein the facilitating comprises facilitating the adjustment of the relative amplitude for the time period.

17. A non-transitory machine-readable storage medium comprising executable instructions that, when executed by a processor of an access point device, facilitate performance of operations, comprising:
facilitating a radio frequency scan within a defined geographical area, wherein a result of the radio frequency scan is indicative of a group of user equipment located within the defined geographical area, and wherein the defined geographical area overlaps a coverage area of an access point device; and
determining, based on monitoring respective call activities of the group of user equipment, a quantity of the user equipment that are initiating an emergency service; and
in response to determining that the quantity of the group of user equipment that have initiated the emergency service exceeds a threshold quantity, facilitating a modification of a relative amplitude of a signal transmitted via of an antenna of the access point device to adjust network coverage in the defined geographical area.

18. The non-transitory machine-readable storage medium of claim 17, wherein the facilitating the modification comprises facilitating the modification based on sensor data received from an acoustic sensor associated with the defined geographical area.

19. The non-transitory machine-readable storage medium of claim 17, wherein the network coverage within the defined geographical area is determined to satisfy a low coverage criterion.

20. The non-transitory machine-readable storage medium of claim 17, wherein the facilitating the modification comprises facilitating the modification based on sensor data received from an optical sensor associated with the defined geographical area.

* * * * *